United States Patent Office 3,415,370
Patented Dec. 10, 1968

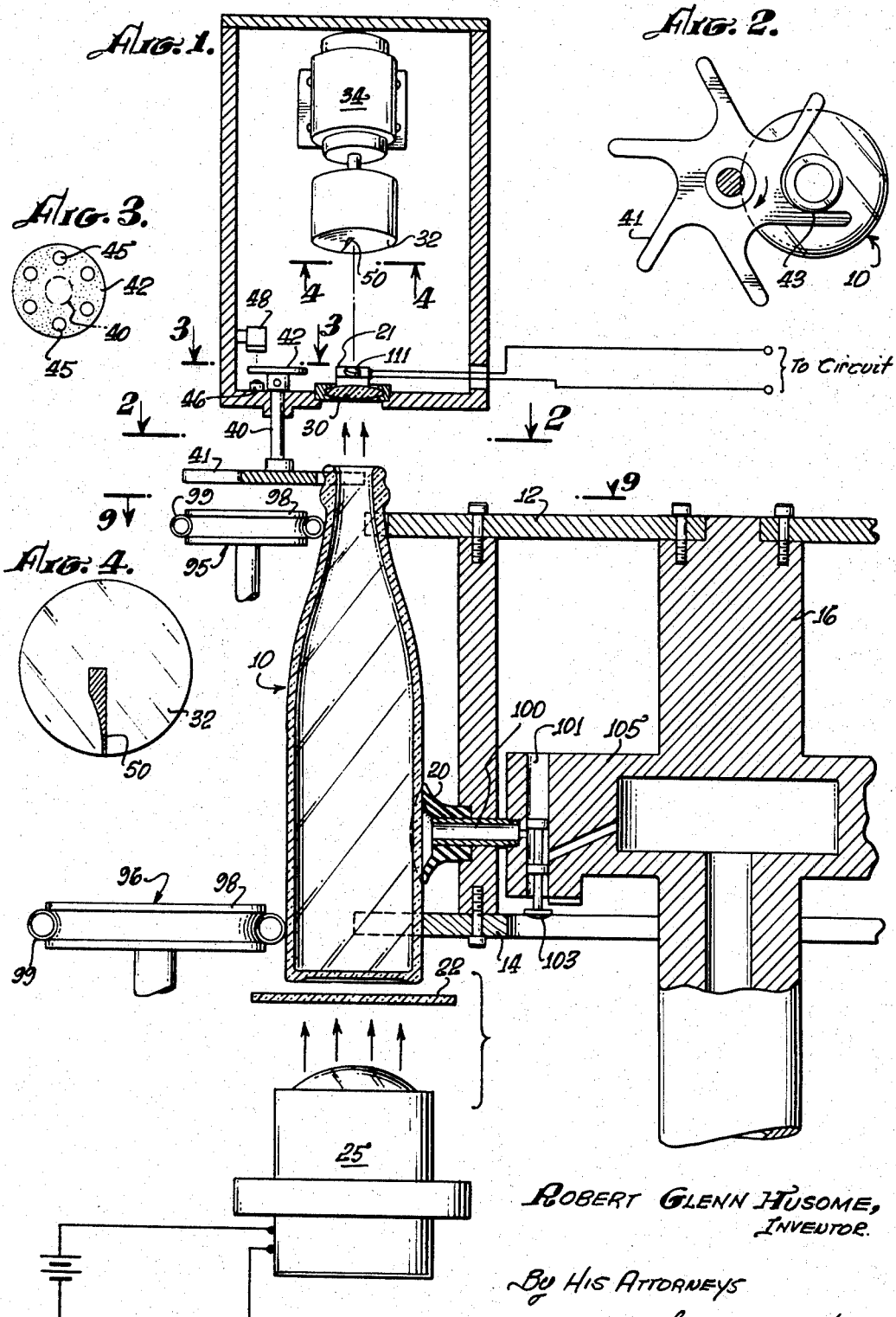

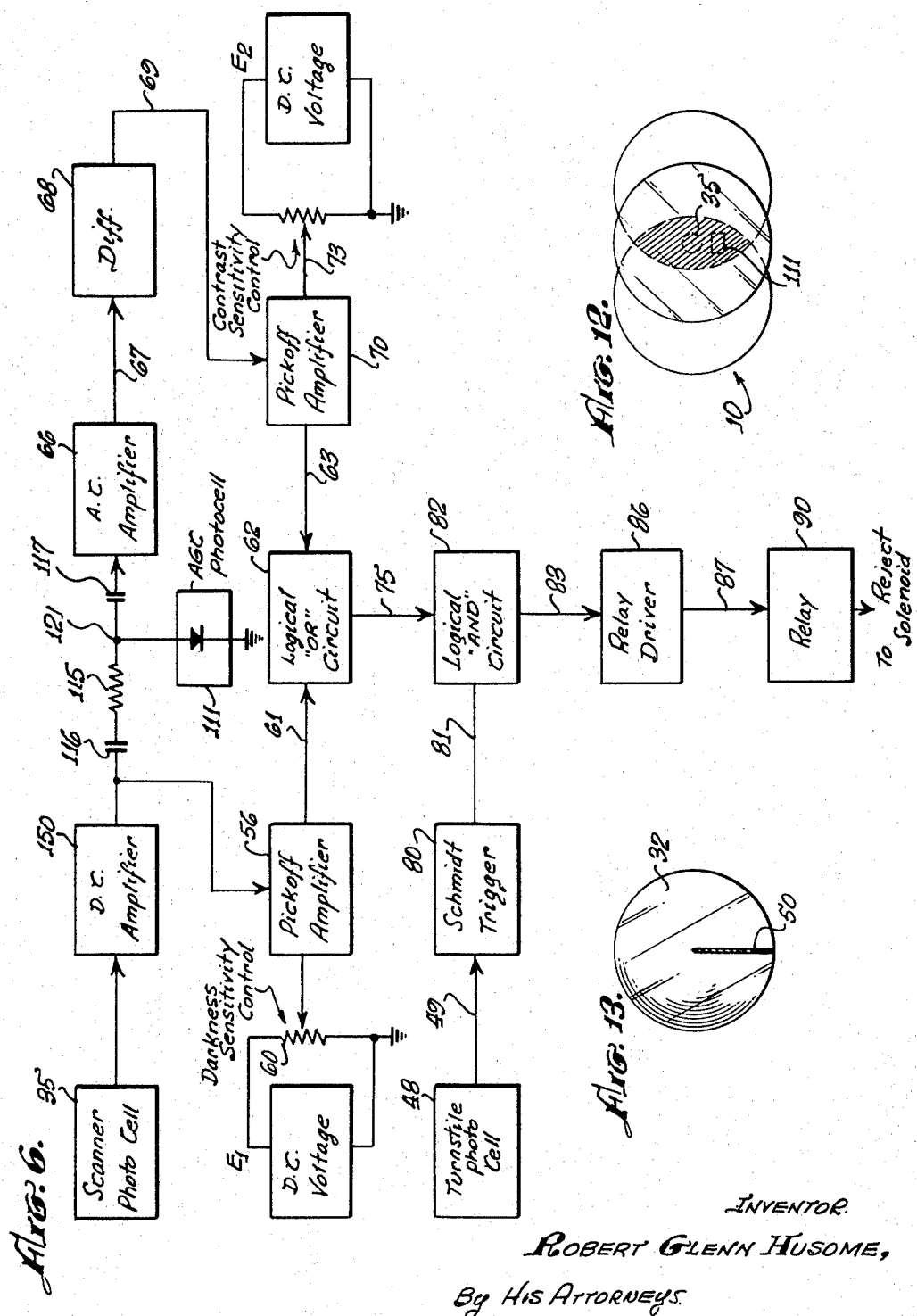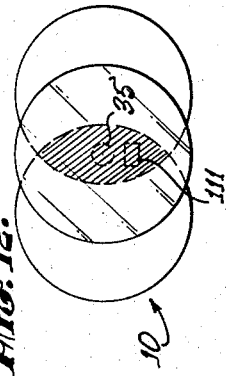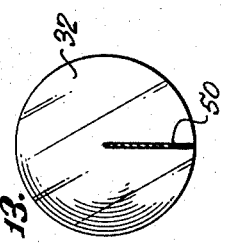

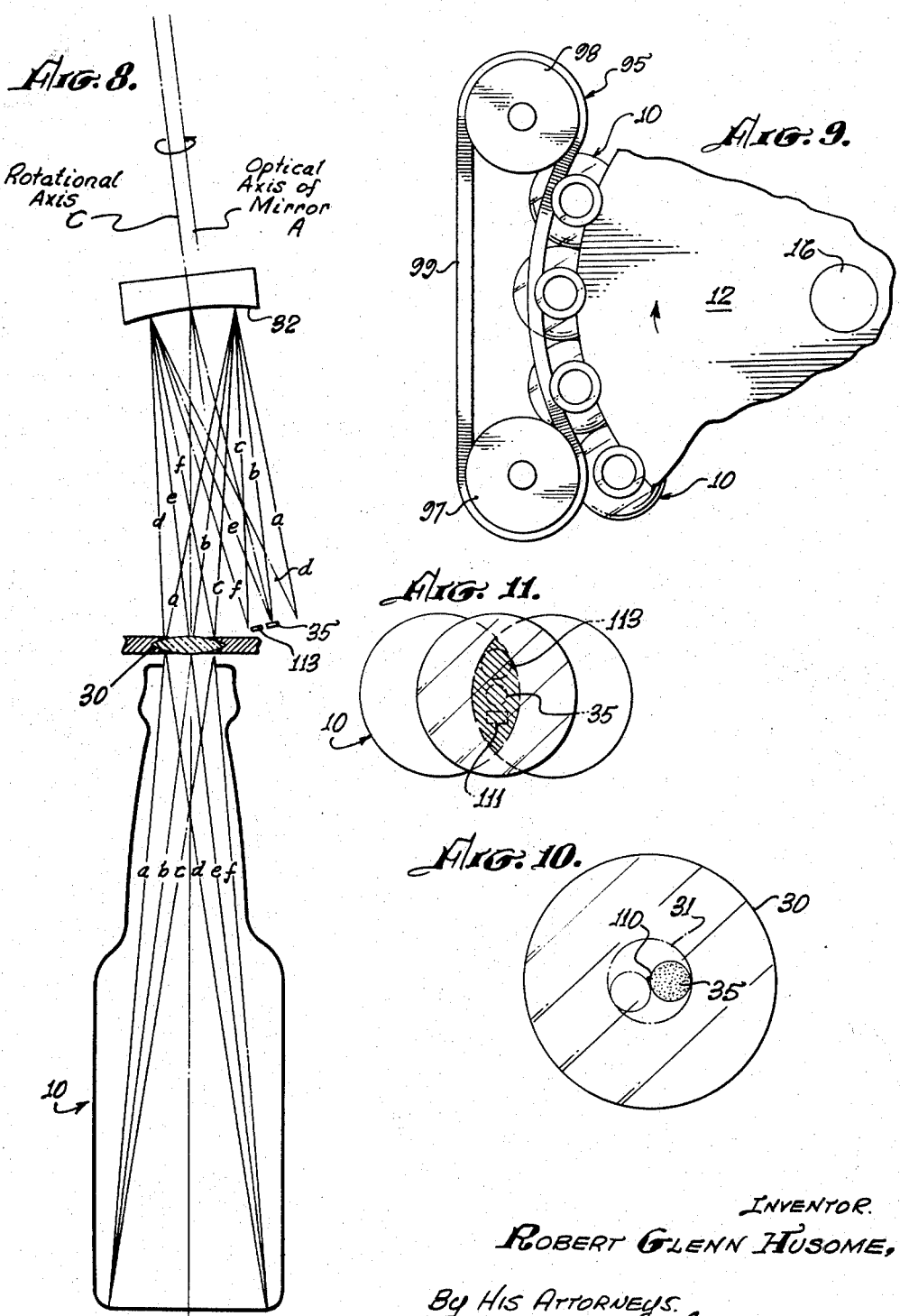

3,415,370
EMPTY BOTTLE BOTTOM AND NECK INSPECTION MACHINE USING RADIATION SENSITIVE MEANS
Robert Glenn Husome, El Segundo, Calif., assignor to San Marino Electronic Corporation, El Segundo, Calif., a corporation of California
Continuation-in-part of application Ser. No. 504,471, Oct. 24, 1965. This application June 3, 1966, Ser. No. 555,148
17 Claims. (Cl. 209—111.7)

This application is a continuation-in-part application of my co-pending application, Ser. No. 504,471, filed Oct. 24, 1965 for Empty Bottle Bottom and Neck Inspection Machine, now abandoned. Ser. No. 504,471 is, in turn, a continuation-in-part of my application Ser. No. 230,345 filed Oct. 15, 1962 for Empty Bottle Inspection Machine, now abandoned.

This invention relates to apparatus for inspecting empty bottles for foreign matter and, more particularly to improvements in the detection portion of such apparatus.

The construction of a successful bottle inspection machine has long been a desired goal. To properly inspect empty bottles for foreign matter presents many problems which have heretofore not been satisfactorily solved. The prior art systems for inspecting empty bottles have complex and bulky scanning systems. The systems in the prior art are, because of their complexity and bulk, quite unreliable. Further the prior art systems inspect only a small part of the entire volume of the bottle; they inspect primarily for foreign matter located at the bottom of the bottle to be inspected.

Accordingly, it is an object of this invention to provide a novel and improved detection system for an empty bottle cleanliness inspection machine.

Another object of this invention is to provide for empty bottle inspection machines, a detection system which is reliable and requires little maintenance and repair.

A further object of this invention is to provide a detection system for an empty bottle inspection machine, which detection system has an automatic adjustment to accommodate bottles of varying opacity.

Another object of this invention is to provide a detection system for an empty bottle inspection machine, which system detects foreign matter in substantially the entire volume of a bottle where foreign matter is likely to occur.

Yet another object of this invention is to provide a detection system of the character described which is capable of detecting foreign matter in a bottle despite a predetermined relatively high level or irregularity in the light transmission characteristics of the glass in the bottles being inspected.

Another object of this invention is to provide a detection system of the character described which is efficient to manufacture.

The present invention, in its presently preferred embodiment, provides an empty bottle detection system, in which a bottle to be inspected passes through an inspection station. Provided in the inspection station is a light source which directs light from a point below the bottle through the bottle bottom. Above the bottle is a light collecting and reflecting optical system. The system is so arranged as to optically view each bottle as it passes through the inspection station. Light from the light source passes upwardly through the bottom of the bottle, thence through a lens which focuses an image of the bottle bottom, the image hereby formed is focused upon a rotating mirror disposed thereabove. The mirror includes a reflecting line or segment upon a dark background and thus during rotation of the mirror, light from successive areas of the bottle image are compared and ultimately discriminated. The light reflected from the mirror is directed to a photocell which reads out the light received. Thus, as each bottle is scanned at the inspection station, a bottle including foreign matter on its bottom or in the vicinity thereof causes a time dependent change in the amount of light falling on the photocell, thus producing a signal which actuates a mechanism (hereinafter described) to remove the bottle as a reject.

The rotating mirror is preferably concave and is of such a design and is placed with respect to the bottle so that the mirror focuses an image of the top of the bottle onto an image plane. The photocell is placed in this image plane and means are provided to scan this image by a wobble motion of the mirror. Thus, the light through a bottle being scanned which has foreign matter in the vicinity of its top also causes a time dependent change in the amount of light on the photocell and the bottle will thus be rejected.

Although the same photocell is used for rejecting the bottle for foreign matter in the top as well as the bottom thereof, it is seen that two scanning phases take place, that of the top of the bottle and that of the bottom. Because of the great depth of focus (hereinafter explained) achieved by the present invention optical system, this two-phase scanning system detects foreign matter in substantially the entire volume of the bottle.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawings:

FIG. 1 is a front elevation, partly in section, showing the present invention apparatus in its preferred embodiment;

FIG. 2 is a partial sectional view taken along line 2—2 of FIG. 1;

FIG. 3 is a view taken along line 3—3 of FIG. 1;

FIG. 4 is a view, somewhat enlarged, taken along line 4—4 of FIG. 1;

FIG. 6 is a block diagram of another circuitry system used in the detection system of the apparatus;

FIG. 8 is a schematic view showing the light ray pattern of the present invention optical system in its presently preferred embodiment;

FIG. 9 is a partial view taken along line 9—9 of FIG. 1;

FIG. 10 is a schematic view showing graphically the scanning action accomplished by the offset axis of the apparatus in FIG. 1 and shown in FIG. 8;

FIG. 11 is a schematic view showing graphically the effective use of the lens aperture of the apparatus of FIG. 1 employing the system of FIG. 5;

FIG. 12 is a schematic view showing graphically the effective use of the lens aperture of the apparatus of FIG. 1 employing the system of FIG. 6; and FIG. 13 is a somewhat enlarged view of the face of surface 32 having thereupon a reflecting segment different from that shown in FIG. 4 as an alternative thereto.

Figure 5:
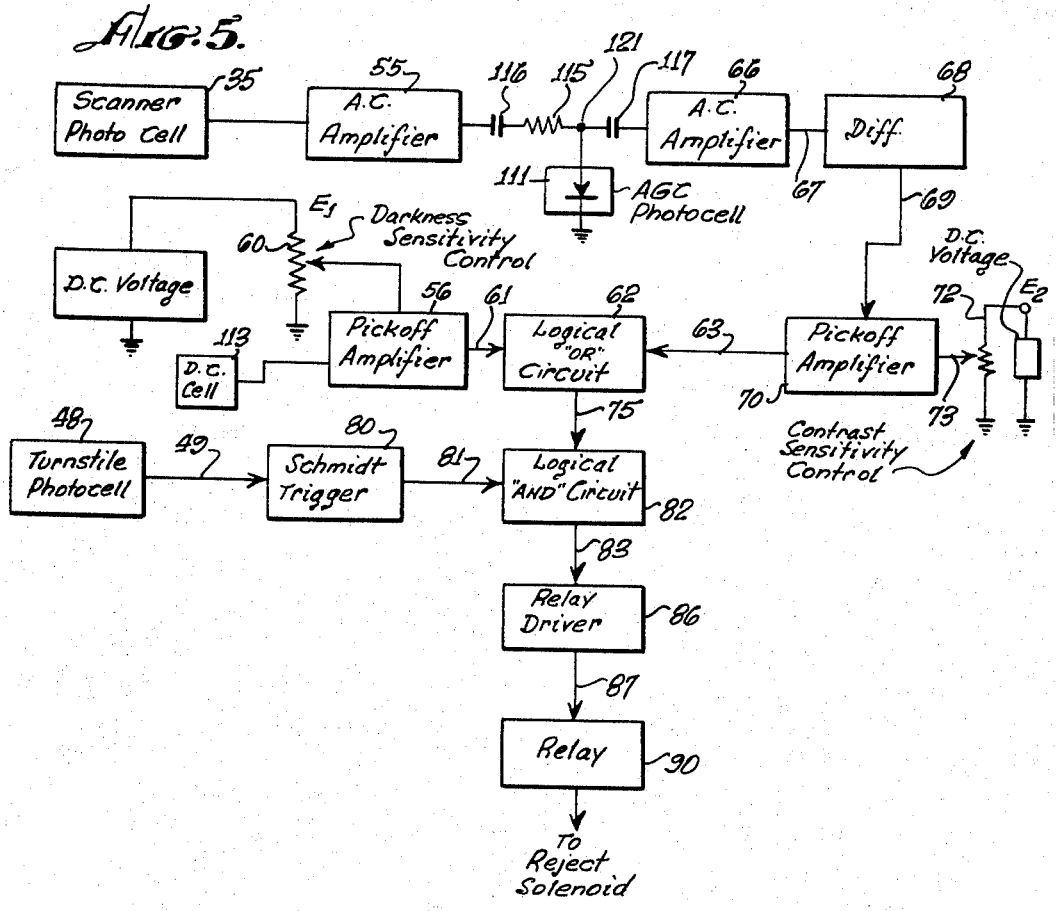
FIG. 5 is a block diagram of one circuitry system used in the detection system of the apparatus of FIG. 1.
Figure 7:
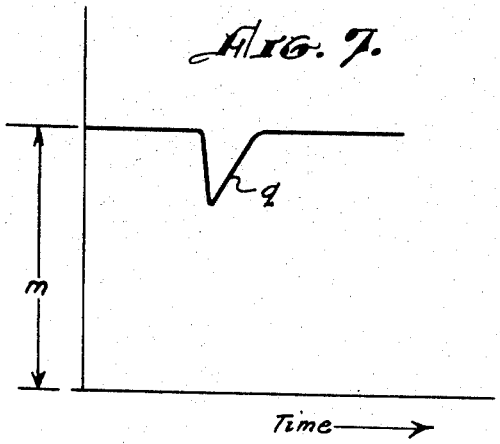
FIG. 7 is a graphic plot showing the light signal intensity as a function of time established at the scanner photocell of FIG. 1.

Referring now to the drawings, there is shown a bottle 10 in the test station position. The bottle is transported through the test station by parallel star wheels 12 and 14 which overhang a conveyor, all in a manner and of a construction well known in the art. This portion of the present invention apparatus is shown in United States Patent No. 2,800,226. The star wheels 12 and 14 are supported by rotor 16 to be driven. The shaft or rotor 16 may be externally driven to thus rotate the star wheels or it, in turn, may be driven by the star wheels in a free wheeling mode of operation. The latter mode of operation may be effected by movement of the bottles through the test station by a bottle conveyor not forming a part of this invention. Near the bottom star wheel 14, and in association with each pocket therein, not shown, there is provided a vacuum operated suction cup 20. The suction cup 20 is adapted to secure and remove a bottle to be rejected in a manner hereinafter to be described.

In operation a bottle 10 in the free wheeling mode is moved into the test station by the conveyor, not shown. The bottle is held in the upright test position as shown in FIG. 1 over a diffused glass plate 22. Located near the upper and lower ends of the bottles, at heights approximately the same as those of the star wheels 12 and 14, is a pair of spring guide members 95 and 96. Their construction may better be seen in FIG. 9. Each of these members includes a pair of vertically supported pulleys 97 and 98 about which is disposed a wound construction spring member 99. Below the diffused glass plate 22 is a light source 25. The light from source 25 passes up through the glass plate 22 and through the bottle 10 to the focusing lens 30. Above the lens 30 is a concave surface 32 which is obliquely supported by the shaft of motor 34, as shown in FIG. 1 and schematically indicated in FIG. 8.

The lens 30 focuses the image of the bottom of the bottle in the inspection station upon the surface 32 which has thereon a mirror segment 50; the remaining surface of the surface 32 is non-reflecting as indicated in FIG. 4. The mirror segment 50, therefore, at all times "sees" a portion of the image of the bottom of the bottle. This portion rotates since the mirror segment 50 directs by reflection the light thereupon to the scanner photocell 35. Photocell 35, to avoid confusion in the drawing, is not shown in FIG. 1. It is shown in FIG. 8 wherein there is a rotation of 90° in the FIG. 8 relative to FIG. 1 in order to clearly show cell 35 and another photocell 113 later to be discussed. Since the image of the bottom of the bottle is focused upon mirror 50 and since the mirror 50 is concave and thus has a focal length as does a lens, the mirror 50 collects the light it receives and directs it toward the photocell. Thus, when mirror 50 during the course of its rotation intercepts an image of a portion of the bottle bottom with a foreign matter particle therein or thereon, the light reflected toward the photocell 35 from mirror 50 will be of reduced intensity (because of the presence of the foreign particle).

As stated hereinabove, surface 32 is concave and, therefore, mirror segment 50 which is upon surface 32 is a concave mirror and thus will focus images as will a lens. The detection system is so arranged and constructed that photocell 35 is placed in an image plane of mirror 50 which image plane is the plane at which an image of lens 30 will be focused by mirror 50. Stated differently, by this optical arrangement an image of the lens 30 is focused onto the surface of the photocell 35, concomitantly the image of the bottom of the bottle is not focused onto the surface of the photocell 35. This construction is readily achieved by using a predetermined mirror concavity, and photocell to mirror distance and lens to mirror distance, all of which are easily calculated by methods well known in the optics art. The concavity of mirror 50 and the photocell 35 to mirror 50 distance will not adversely affect the detection in the vicinity of the bottom of the bottle. That is, to provide the proper optical structure, it is necessary to place lens 30 at the focal plane of mirror 50. Also, the mirror 50 must be located at the focal plane of lens 30 so that the bottom of the bottle will be focused by lens 30 on the mirror surface 50. This is easily achieved, when it is recognized that photocell 35 need not be at a focal length of lens 30 since the image of the bottom of the bottle need not and indeed should not be in focus on the photocell but need only be in focus upon surface 32.

Thus, be the arrangement hereinabove described, lens 30 is focused by mirror 50 onto photocell 35 and thus photocell 35 sees an image of lens 30 and will see foreign matter in the vicinity thereof (and near the neck of the bottle). In FIG. 1 the distance between the bottom of lens 30 and the top of the neck of the bottle is greatly exaggerated; they, in fact, in order to accomplish the above, are placed as close together as is practically possible (which is shown more accurately in FIG. 8). As will be described hereinbelow in greater detail, the photocell 35 scans the top region of the bottle.

It is possible, of course, to observe and inspect the bottom and top regions of the bottle by utilizing two sensors instead of one; however, this makes the unit less reliable and more complex and more difficult to calibrate accurately.

The present invention optical system with its double focusing system may be best understood with reference to FIG. 8, wherein the focusing of the images is schematically shown.

The light rays passing upwardly from the bottom of the bottle pass through lens 30 and are focused by lens 30 onto surface 32. This is seen by rays *a*, *b* and *c* which emanate from one point and which are focused by lens 30 to a single point on surface 32. Rays *d*, *e* and *f* are similarly focused by lens 30 onto surface 32. As mirror segment 50 sweeps a complete revolution as schematically represented in FIG. 8, rays *a*, *b* and *c* will be defocused by mirror 50 and be reflected to the surface of photocell 35. A second photocell 113 is positioned adjacent to photocell 35 as is shown in FIGS. 8 and 11 for the purpose hereinafter to be explained. If the portion of the image of the bottom that mirror 50 sees at any instant has a particle of foreign matter therein, the light intensity reflected to the photocell will be momentarily substantially reduced; this change in light intensity can be detected and used to actuate the rejection system hereafter described. The change is momentary because of the rotation of mirror 50 and the change will be substantial because as can be seen in FIG. 4, the ratio of the area of mirror segment 50 to the area of surface 32 is quite low. The rotation rate of mirror 50 in the presently preferred embodiment is 12,000 r.p.m. This is one revolution per 5 milleseconds and corresponds to a scan rate of 200 c.p.s. Thus the bottom of the bottle is scanned at a rate of 200 times per second.

The image of the aperture of lens 30 is focused by mirror 50 onto photocell 35. As can be seen in FIG. 8, rays *a*, *d* which emanate from a single point on lens 30 are, therefore, focused as a single point in the vicinity of photocells 35 and 113. Similarly focused are ray pairs *b*, *e*, and *c*, *f*.

The detection system operates on the rate of change of intensity of light resulting when a particle of foreign matter is encountered in the course of scanning the bottle.

In order to provide a scanning of the region in the top of bottle 10, means are provided to effectively scan the top region to give an effect which is equivalent to that from scanning the bottom of the bottle by rotating mirror 50. The top region of the bottle is scanned by orbiting the image on photocell 35. To achieve this the optical and rotating axis of surface 32 and mirror 50 are displaced as can be noted in FIG. 8. The rotational axis of *C* is laterally displaced from the center or optical axis *A* so that with respect to photocell 35, the surface 32 and mirror 50 wobble. Thus, the image of the aperture of lens 30 which is focused by mirror 50 onto photocell 35 wobbles with respect to photocell 35. As can be seen in FIG. 11, the image of the lens 30 aperture is much larger than the viewing area of photocell 35. It can, therefore, be readily seen that if mirror 50 did not wobble, photocell 35 would observe only a fixed area of the image of the top of the bottle and would not see the momentary change in light intensity necessary to actuate the reject mechanism in all situations. For example, if a line object such as a pin were caught in the neck of the bottle the photocell 35 would see it at all times were it not for the wobble and thus not indicate that foreign matter was there present. However, with the wobble effect as shown schematically in FIG. 10, the image of the line object would wobble on and off of photocell 35 and thus produce the proper signal for rejection of a bottle which has foreign matter in the neck region. The wobble effect can be accomplished by displacing axis C as described hereinabove and shown in FIG. 8, or exactly the same result is achieved by tilting the mirror on its rotational axis. The amount of displacement in the presently preferred embodiment is of the order of the O.D. of photocell 35 as may be seen in FIG. 10. A typical O.D. for the photocell is ⅛ inch.

Thus, it is seen that by this novel optical and mechanical structure, both the top and bottom regions of bottle 10 are inspected for the presence of foreign matter. As is well known in the optics art, the effective $f$ stop of the system described herein can be very small. A small aperture gives a correspondingly high depth of focus, so that in actual operation of the detection system, foreign matter can be detected not only at the bottom of the bottle but in a region substantially thereabove. Further, because lens 30 is very close to the top of bottle 10, approximately within ⅛ inch, the detection at the top of the bottle 10 extends throughout the entire neck region due to the great depth of focus. Thus, the detection takes place in substantially the entire volume of the bottle in which foreign matter is likely to occur.

Referring again to FIG. 1, mounted alongside lens 30 and on an axis parallel thereto is a shaft 40. The shaft 40 rotatably carries a turnstile wheel 41 which engages the neck of the bottle being inspected. The wheel 41 is designed so that the pockets defined thereby serve to nest the bottles in such a position that the axis of the bottle is on a parallel line with the axis of the wheel and the edge of the bottle making contact with the side 43 of the wheel is such that a line tangent thereto is parallel to a diameter of the wheel. A wheel 42 mounted on the opposite end of the shaft 40 is opaque to light except for the provision of equally spaced transparent openings 45 placed at predetermined angular intervals as shown in FIGURE 3. These openings are at angular positions on the wheel which corresponds to the position of the neck of the bottle 10 as it is seated within the pocket of the wheel 41. Just below the wheel 42 there is disposed a small light source 46 which is in the line of the openings 45. Just above the light source 46 and above the wheel 42 is mounted a turnstile photocell 48. The entire inspection head structure which includes the surface 32 and mirror segment 50, lens 30, cells 35 and 48 and associated elements is arranged to be raised and lowered in accordance with the height of the bottles to be inspected.

In FIG. 4, there is shown the reflecting segment 50 which is a portion of the surface 32, which surface except for segment 50 is non-reflecting. In the presently preferred embodiment of this invention, segment 50 is reflecting and surface 32 generally non-reflecting. It is also possible to have segment 50 non-reflecting and surface 32 generally reflecting.

Referring now to FIG. 5, it will be seen that the output signal from the scanner cell 35 is fed to an amplifier 55 of conventional design. The output signal from cell 35 consists of a steady state component $m$ and a non-steady state component $q$. The component $m$ corresponds to the average light transmission of the bottle. It is a function of the opacity of the bottle. The non-steady state component $q$ results from the change effected on the light intensity which change derives from foreign matter being present in the bottle and also from contrasting areas in the bottle such as lettering imprinted in the glass and imperfections in the glass. Part of the component $q$ also results from the bottle being moved through the inspection station as it is being scanned. Since the component $q$ results from changes in contrast during scanning, its amplitude is dependent on the opacity of the bottle also. That is, less signal change will result from a foreign particle lying in a dark bottle than would in a light bottle. The cell 35 is of the silicon photovoltaic type; however, any type of photocell including photoresistive types may be used. The photovoltaic cell was chosen in the embodiment associated with FIG. 5 because of its wide spectral response and rapid response. The cell 35 can be used successfully with most bottles that are presently in commercial use in liquid bottling plants.

The output of A.C. amplifier 55 (of conventional design) at point 121 will be the component $q$ multiplied by the gain of amplifier 55 and divided by the voltage divider formed by resistor 115 and the impedance of the AGC cell 111.

Photocell 111 is provided as a means to automatically compensate for light changes which are primarily due to differences in opacity from bottle to bottle. Cell 111 is located above lens 30 on bracket 21. Because of its location, cell 111 "sees" light emanating from the bottom of the bottle and also light emanating from the walls of the bottle, thus the parameters of cell 111 will be dependent upon the average light emanating from the bottle. If the light emanating from the bottle varies, the impedance of cell 111 also varies and thus changes the voltage output at point 121. By proper selection of photocell 111 and resistor 115 by methods well known in the art, the cell 111 serves as an automatic compensation control such that detection will be equally efficient and accurate in bottles of widely varying opacity.

It is readily seen from the inclusion of a capacitors 116 and 117 in the circuit that all electronic operations on the signal from scanner cell 35 are on the non-steady state signal component $q$ alone. The output from point 121 which is light compensated is then fed into A.C. amplifier 66 (of conventional design) for further amplification. The output of amplifier 66 is then fed into a conventional differentiation circuit 68 so that the output signal appearing at terminal 69 is proportional to the slope of the signal received at the terminal 67. Thus, the magnitude of the signal appearing at terminal 69 represents the abruptness of change of the light signal passing through the bottle as received by the scanner photocell.

The output of the differentiation circuit 68 is fed to pickoff amplifier 70. Amplifier 70 is a high gain-differential amplifier of a kind well known in the art.

A potentiometer 60 connected to a source of voltage E is adjusted to produce a predetermined voltage which is a function of the light transmission characteristics of the particular run of bottles being tested. Thus, the potentiometer is designed in FIG. 5 as the darkness sensitivity control. The voltage produced by potentiometer 60 provides a reference voltage into pickoff amplifier 56 which is an amplifier of the same type as amplifier 70. The reference voltage is compared by means of amplifier 56 to the D.C. voltage produced by photocell 113. Photocell 113 receives the light from mirror 50 as does photocell 35. Photocell 113 serves to generate a D.C. voltage representative of the light level passing through the bottom and neck of bottle 10. The output of photocell 113 is fed to one of the inputs of differential amplifier 56. Photocell 113 in the presently preferred embodiment is of the photoresistive type cadmium selenide, chosen for its capabilities of high output. Other photocells can also be used with proper adaptation of circuitry. Thus, amplifier 56 produces an output signal which depends on the differential between the outputs from potentiometer 60 and photocell 113. Photocell 113 is placed next to scanner cell 35 and thus sees the same thing as cell 35, i.e., the light reflected from mirror segment 50 which is derived from the light passing through the bottom of the bottle being inspected. The output of amplifier 56 is thus an indication of the opacity of the bottom of the inspected bottle. The signal is, therefore, utilized as described hereinafter, to determine whether the bottle is unacceptable because the bottom of the bottle is sufficiently dark that either it is heavily covered with foreign matter in a uniform manner or is so dark itself that foreign matter therein cannot be detected; the same will also indicate that the neck of the bottle is obscured as by a large object within the bottle or a cap on it.

Normally the voltage established by the potentiometer 60 is lower than that of the signal anticipated at the input of the amplifier 56. If it is assumed that this amplifier has sufficient gain, it will thus be driven into negative saturation. When the bottle under inspection is so dark and opaque as to be unacceptable (i.e., foreign matter contained therein could not be detected), the signal at the input of the amplifier 56 is less than the voltage established by the potentiometer 60; thus, the pick-off amplifier will be driven into positive saturation and an output signal will appear at the output terminal 75 of "or" gate 62. Gate 62 is an "or" gate of conventional design which is adapted to produce an output signal if there is a signal of a predetermined level established at either of its input terminals 61 or 63.

As described hereinabove, the differential signal at terminal 69 is fed to amplifier 70. Also fed into amplifier 70 as in amplifier 56, is a predetermined reference voltage which is the contrast sensitivity voltage established by potentiometer 72 at terminal 73.

Whenever the signal at 69 is greater than the voltage at 73, assuming amplifier 70 has sufficient gain, this amplifier will be driven to positive saturation and a predetermined positive voltage will appear on terminal 63 at the input of "or" gate 62. As previously mentioned, whenever an input signal appears at either input terminal 61 or 63 of "or" gate 62, there will appear an output signal therefrom at its output terminal 75. The output signal at terminal 75 feeds a conventional "and" gate 82 which is adapted to produce a signal at its output terminal 83 only when signals are present at both of its input terminals, namely, 75 and 81.

The turnstile photocell 48 is energized for a period of time which is a function of the velocity of the bottle in the inspection station as it moves a predetermined distance, preferably ¼ inch. This is accomplished by providing openings 45 within the wheel 42 of the predetermined size.

The wheel 42 is caused to rotate by movement of the bottle through the inspection station. Thus, a signal will appear at the output terminal 49 of the photocell 48 during the time the bottle moves a predetermined distance. This time interval is not fixed. It is a function of the speed of the bottles. The positioning of the wheel 42, the turnstile photocell 48, and light 46 is such that the cell 48 receives light just before, during, and just after the time that the bottle under inspection is centered on the optical axis of lens 30.

The output signal at terminal 49 from the turnstile photocell 48 drives a Schmitt trigger circuit 80 which produces a square wave output signal at terminal 81. The leading and trailing edge of this square wave signal corresponds to the bottle position ⅛″ before and ⅛″ past the optical axis of lens 30.

The concurrence of signals at terminals 75 and 81 will produce an output signal at terminal 83 as this is the condition required to generate a signal by "and" gate 82. An output signal from "and" gate 82, in turn serves to trigger relay driver 86 which may be a conventional one shot multivibrator. Thus, a pulse of a fixed amplitude and duration will be presented at a terminal 87 to actuate relay 90. Relay 90 serves to close the circuit to a reject solenoid not shown, associated with the vacuum line leading to the suction cups previously mentioned.

The suction cup 20 shown in FIG. 1 will thus receive a vacuum through an opening 100 connected through a passageway 101 to a vacuum pump, not shown. A valve 103 is shown in the reject position permitting the vacuum to secure the bottle to the cup. After the reject solenoid has driven the valve 103 into the position shown, it will remain in this position until the valve plate and associated star wheels have rotated a fixed number of degrees, and delivered the reject bottle to the ejection position. At this point, the depressed valve contacts a claw-shaped reset cam, not shown. The mushroom head of the valve spool is retracted to its normal position by cam action as the valve plate continues to rotate, which opens the passageway 100 to the atmosphere. All of this portion of the reject mechanism is well known in the art.

Reference is again made to FIG. 8 in order to further explain the present invention optical system. Assuming no pattern on reflecting segment 50 on the face of the surface 32, whether rotating or not, and assuming that the bottle being inspected has a homogenous bottom without nomenclature, and no foreign matter in the bottle, a steady state light beam of a predetermined intensity will be seen by the photocell 35. This in turn will result in no signal at the output of amplifier 55. Note that as the photocell is smaller than the lens aperture, it will see only a portion of the light (presumably at the center) passing through the focusing lens 30. If, however, a particle of foreign matter appears in segment 50 when it is not rotating, the light intensity reaching the photocell will be of a steady state at a level less than that absent the particle of foreign matter as now less light reaches the mirror. If the mirror is now rotated, the reduced light intensity seen by the photocell will be further reduced on each revolution during the instant in time when there is a coincidence in the position of the reflecting segment 50 with the image of the particle of foreign matter as seen by the mirror; this lessening of light intensity serves momentarily to decrease the light intensity seen by the photocell and produce the non-steady state $q$ component signal. It will at once be apparent that other optical irregularities, such as inconsistencies in the light transmission characteristics over the bottom of the bottle and other factors previously mentioned, will further contribute to the component $q$.

In FIG. 8 there are shown two axes for the spherical surface 32, one being the optical axis A and the other a rotational axis C. While both axes, in the simplest embodiment are coincident, in the presently preferred embodiment they are displaced as shown. The displacement will typically be about the same as the radius of the photocell 35, i.e., approximately ⅛″. With this displacement there will be a wobble or orbiting. The portion of the lens aperture viewed by the photocell will then effectively be a circle 31 having as its radius the diameter of the photocell 35 (see FIG. 10). This results in a motion which effectively acts as if the photocell were rotated about the axis 110 of the aperture of lens 30 (shown greatly enlarged in FIG. 10. This serves to have the photocell view a line object which may be lodged in the neck of the bottle, that is, in the upper third thereof outside of the viewing range of the system absent the orbiting mode here described. This is due to the fact that there will be a time dependent change in light intensity reaching the photocell each time the photocell effectively passes over the line object constituting an article of foreign matter within the neck of the bottle and thus produce a non-steady state signal of the same kind as would be produced through scanning of the bottle bottom by rotation of segment 50.

As has previously been mentioned, it is important to have the bottle move during the inspection cycle, only in order to detect a discrete particle which is directly centered within or near the bottom of the bottle. If this is not done, the reflective segment 50 of the rotating surface 32 would never scan the image of this particle, and no time dependent change in light intensity would reach the photocell.

Referring to FIG. 4, reflective segment 50 is made progressively wider towards the center of surface 32 according to a predetermined curve. This widening is done to provide linear response for scanning particles in different areas of the bottom of the bottle. The scanning area is circular, and thus particles at the periphery will be seen for a shorter time duration than particles at the center, thus producing a more abrupt change which will be differentiated by circuit 68. To achieve linearity in the output of circuit 68, segment 50 is tailored to produce large amplitude pulses upon scanning of particles located towards the center of the bottle so that the differentiated signal out of circuit 68 will be of the same peak amplitude as when peripheral particles are scanned.

Reference is now made to FIGS. 6 and 12 which may be said to provide an alternate embodiment of a circuit and optical system to be used in conjunction with the apparatus of FIG. 1. In this embodiment the circuit and optics are essentially the same in construction and operation as was shown and described in connection with FIGS. 5 and 11. The only differences are as follows: The D.C. photocell 113 of FIG. 5 and 11 is deleted. In addition, the A.C. amplifier 50 of FIG. 5 is replaced by a D.C. amplifier 150 of conventional design. Further, the pickoff amplifier 56 receives its signal in the FIG. 6 embodiment directly from the D.C. amplifier 150 instead of from the D.C. photocell 113 of the FIG. 5 embodiment.

The operation of the FIG. 6 circuit is essentially the same as that described in connection with FIGS. 5 and 11 with the following modifications: The scanner photocell 35 is selected to have the characteristics whereby its response time and signal sensitivity are both sufficiently high to enable it to sense the level of light passing through the bottle and the rapid changes $q$ in light level which occur when scanning foreign particles as small as ⅛" in diameter. The D.C. amplifier 150 amplifies both of these components of this signal. The output from amplifier 150 is applied to the pick-off amplifier 56 and to the capacitor 116. The D.C. light level component is fed to amplifier 56 and serves to generate a D.C. voltage representative of the light level passing through the bottom and neck of the bottle 10. The pulse or $q$ component is fed to A.C. amplifier 66 via capacitor 116, resistor 115 and capacitor 117, all serving the same purpose as discussed in connection with FIG. 5. Thus this is a simplified system, eliminating one photocell and thus making the system simpler and more reliable.

In the presently preferred embodiment the reflecting mirror segment 50 preferably extends from the center to the edge of the rotating surface 32. Near the edge it assumes a line shape of a narrow width preferably of the order of 1/32". The under portion near and at the center is preferably ⅛", all of this from a surface 32 of 2" in diameter. Thus it is seen that the ratio of the area of the nonreflecting to the reflecting surface portion of surface 32 is large, i.e. of the order of 50:1. This is determined by determining the area of the segment 50 by assuming it approaches a rigid triangle 1" x ⅛" having an area of 1/15 square inch. The total area is $\pi \times 1 = 3.14$ square inches. Further, the present invention resides not only in providing a large ratio as described above wherein the maximum width of the segment should be no greater than the O.D. of the smallest particle to be detected; herein ⅛" is assumed. Additionally, whether one reflecting or several reflecting areas are employed, it is preferable to have them constitute a small portion of the total area, i.e., of the order of less than 1/10. This has been found to substantially improve the system detection capability and especially the signal to noise ratio.

Another variation in the present invention optical system which may be used within the spirit and scope of the invention is to substitute a rotating plano convex lens with a flat mirror surface to direct the light from the bottle to the photocell 35.

There has thus been described a new and improved empty bottle inspection detection system of improved design. It will then be understood that various modifications may be made without departing from the spirit of the invention. For example, several mirrored segments may be employed in place of the one segment 50 located upon surface 32. In addition, the shape of such segment may be altered to compensate for the difference in the tangential velocity of each point on the line as it extends outwardly from the center of the mirror. Another technique for compensating for this differing speed may be by the use of variable intensity filters or by varying the reflectivity of the segment along its radial dimension.

What is claimed is:

1. In an empty bottle inspection machine, a detection system for detecting the presence of foreign matter within a bottle, said detection system comprising:
   (a) means for directing radiant energy through a bottle;
   (b) means for focusing from said radiant energy an image of the bottom of said bottle;
   (c) a rotating surface having thereon a reflective segment, said surface being concave and located in the image plane of said bottom of said bottle as focused by said focusing means;
   (d) said reflective segment being arranged to scan said image of said bottom of said bottle during rotation of said surface;
   (e) a radiant energy sensor, said sensor being disposed in the path of radiant energy reflected from said segment, whereby the amount of said energy received by said segment is momentarily substantially varied whenever said segment in the course of rotation thereof coincides with the image of a particle of foreign matter disposed in said bottle proximate the bottom thereof;
   (f) said rotating surface having a predetermined concavity and being arranged so that the area proximate the neck of said bottle is focused by said reflective segment on said surface to an image plane;
   (g) said radiant energy sensor being located in said image plane of said bottle neck;
   (h) means for scanning said bottle neck image by said sensor whereby the amount of radiant energy received by said sensor is momentarily substantially varied whenever said sensor in the course of scanning coincides with the image of a particle of foreign matter disposed in said bottle neck;
   (i) circuit means for producing an output signal indicating the condition of said sensor; and
   (j) means responsive to said output signal for rejecting a bottle from said inspection machine whereby when said output signal indicates the presence of foreign matter, the bottle is rejected.

2. In an empty bottle inspection machine, a detection system for detecting the presence of foreign matter within a bottle, said detection system comprising:
   (a) means for directing radiant energy through a bottle;
   (b) means for focusing from said radiant energy an image of the bottom of said bottle;
   (c) a rotating surface having thereon a reflective segment, said surface being concave and located in the image plane of said bottom of said bottle as focused by said focusing means;
   (d) said reflective segment being arranged to scan said image of said bottom of said bottle during rotation of said surface;

(e) a first radiant energy sensor, said sensor being disposed in the path of radiant energy reflected from said segment, whereby the amount of said energy received by said segment is momentarily substantially varied whenever said segment in the course of rotation thereof coincides with the image of a particle of foreign matter disposed in said bottle proximate the bottom thereof;

(f) said rotating surface having a predetermined concavity and being arranged so that the area proximate the neck of said bottle is focused by said reflective segment on said surface to an image plane;

(g) a second radiant energy sensor being located in said image plane of said bottle neck;

(h) means for scanning said bottle neck image by said second sensor whereby the amount of radiant energy received by said second sensor is momentarily substantially varied whenever said second sensor in the course of scanning coincides with the image of a particle of foreign matter disposed in said bottle neck;

(i) circuit means for producing output signals indicating the conditions of said sensors; and (j) means responsive to said output signals for rejecting a bottle from said inspection machine whereby when said output signals indicate the presence of foreing matter, the bottle is rejected.

3. In an empty bottle inspection machine, a detection system for detecting the presence of foreign matter within a bottle, said detection system comprising:

(a) means for directing radiant energy through a bottle;

(b) means for focusing from said radiant energy an image of the bottom of said bottle;

(c) a rotating surface having thereon a reflective segment, said surface being concave and located in the image plane of said bottom of said bottle as focused by said focusing means;

(d) said reflective segment being arranged to scan said image of said bottom of said bottle during rotation of said surface;

(e) a first radiant energy sensor, said sensor being disposed in the path of radiant energy reflected from said segment, whereby the amount of said energy received by said segment is momentarily substantially varied whenever said segment in the course of rotation thereof coincides with the image of a particle of foreign matter disposed in said bottle proximate the bottom thereof;

(f) said rotating surface having a predetermined concavity and being arranged so that the area proximate the neck of said bottle is focused by said reflective segment on said surface to an image plane;

(g) said first radiant energy sensor being located in said image plane of said bottle neck;

(h) means for scanning said bottle neck image by said first sensor whereby the amount of radiant energy received by said first sensor is momentarily substantially varied whenever said first sensor in the course of scanning coincides with the image of a particle of foreign matter disposed in said bottle neck;

(i) a second radiant energy sensor so located as to sense energy transmitted through the bottom of said bottle;

(j) circuit means for producing output signals indicating the conditions of said sensor; and (k) means responsive to said output signals for rejecting a bottle from said inspection machine, whereby when said output signals indicate the presence of foreign matter or indicates a bottle so opaque that foreign matter could not be detected, the bottle is rejected.

4. In an empty bottle inspection machine, a detection system for detecting the presence of foreign matter within a bottle, said detection system comprising:

(a) means for directing radiant energy through a bottle;

(b) means for focusing from said radiant energy an image of the bottom of said bottle;

(c) a rotating surface having thereon a reflective segment, said surface being concave and located in the image plane of said bottom of said bottle as focused by said focusing means;

(d) said reflective segment being arranged to scan said image of said bottom of said bottle during rotation of said surface;

(e) a first radiant energy sensor, said sensor being disposed in the path of radiant energy reflected from said segment, whereby the amount of said energy received by said segment is momentarily substantially varied whenever said segment in the course of rotation thereof coincides with the image of a particle of foreign matter disposed in said bottle proximate the bottom thereof;

(f) said rotating surface having a predetermined concavity and being arranged so that the area proximate the neck of said bottle is focused by said reflective segment on said surface to an image plane;

(g) said first radiant energy sensor being located in said image plane of said bottle neck;

(h) means for scanning said bottle neck image by said first sensor whereby the amount of radiant energy received by said first sensor is momentarily substantially varied whenever said first sensor in the course of scanning coincides with the image of a particle of foreign matter disposed in said bottle neck;

(i) a second radiant energy sensor so located as to sense energy transmitted through the bottom of said bottle;

(j) circuit means for producing output signals indicating the condition of said sensors;

(k) means for automatically controlling the gain of the system, whereby inspection parameters remain the same for bottles of different opacity; and (l) means responsive to said output signals for rejecting a bottle from said inspection machine, whereby when said output signal indicates the presence of foreign matter or indicates a bottle so opaque that foreign matter could not be detected, the bottle is rejected.

5. A detection system as in claim 4 wherein said reflective segment is of predetermined shape for linear scanning response.

6. A detection system as in claim 4 wherein said radiant energy sensors and said gain control means are photocells.

7. In an empty bottle cleanliness inspection machine, a detection system for detecting the presence of foreign matter within a bottle at an inspection station, said detection system comprising:

(a) means for directing radiant energy through a bottle at said inspection station;

(b) a reflecting surface concave on an optical axis disposed in a position to receive radiant energy passing through said bottle;

(c) means for rotating said reflecting surface on an axis other than the optical axis to provide a wobble motion for scanning a bottle neck region;

(d) means for focusing the image of the bottom of said bottle on said reflecting surface;

(e) a photocell disposed to receive radiant energy reflected from said reflecting surface;

(f) a non-reflecting line disposed on said reflecting surface, said reflecting surface reflecting the received radiation to said photocell whereby the total amount of said energy received by said reflecting surface is momentarily substantially varied whenever said non-reflecting line in the course of its rotation momentarily coincides with the position of the image of a particle of foreign matter disposed within said bottle;

(g) said photocell being located with respect to said focusing means and said reflecting surface so that said photocell is in the image plane of said focusing means, as focused by said reflecting surface; and (h) means for determining the positioning of a bottle relative to said inspection station and for providing a signal indicating that the bottle is in said inspection station.

8. The machine of claim 7, said means for directing said radiant energy including a light source and lens means.

9. The machine of claim 7, said rotational and optical axes being parallel.

10. In an empty bottle cleanliness inspection machine, a detection system for detecting the presence of foreign matter within a bottle at an inspection station, said detection system comprising:

(a) means for directing radiant energy through a bottle at said inspection station;

(b) a non-reflecting surface disposed in a position to receive radiant energy passing through said bottle;

(c) a reflecting line concave on an optical axis disposed on said non-reflecting surface;

(d) means for rotating said surface and line on an axis other than the optical axis to provide a wobble motion for scanning a bottle neck region;

(e) means for focusing the image of the bottom of said bottle on said surface and line;

(f) a photocell disposed to receive radiant energy reflected from said reflecting line, said reflecting line reflecting the received radiation to said photocell whereby the total amount of said energy received by said reflecting line is momentarily substantially varied whenever said line in the course of its rotation momentarily coincides with the position of the image of a particle of foreign matter disposed within said bottle;

(g) said photocell being located with respect to said focusing means and said reflecting line so that said photocell is in the image plane, as focused by said reflecting line, of said focusing means; and (h) means for determining the position of a bottle relative to said inspection station and for providing a signal indicating that the bottle is in said inspection station.

11. In an empty bottle cleanliness inspection machine, a detection system for detecting the presence of foreign matter within a bottle at an inspection station, said detection system comprising:

(a) means for directing radiant energy axially through the bottom of a bottle at said inspection station;

(b) lens means for receiving radiant energy which has passed through said bottle bottom and for focusing said radiant energy;

(c) a reflective surface concave on an optical axis positioned substantially at a focal plane of said lens means, a non-reflecting line on said reflecting surface;

(d) means for rotating said reflecting surface on an axis other than the said optical axis to provide a wobble motion for scanning a neck region of a bottle, said rotational axis being inclined with respect to the axis defined by said radiant energy means and said lens means;

(e) photocell means in a focal plane of said concave reflecting surface for receiving radiation therefrom; and (f) circuit means connected with said photocell means for producing a signal when the amount of radiant energy received by said photocell means is momentarily substantially varied, whereby a signal is generated whenever said non-reflecting line in the course of its rotation momentarily coincides with the position of the image of a particle of foreign matter in said bottle.

12. In an empty bottle cleanliness inspection machine, a detection system for detecting the presence of foreign matter within a bottle at an inspection station, said detection system comprising:

(a) means for directing radiant energy through a bottle at said inspection station;

(b) a reflecting element concave on an optical axis disposed in a position to receive radiant energy passing through said bottle;

(c) a non-reflecting element disposed in the path of light between said radiant energy directing means and said photocell;

(d) means for rotating said elements including means for rotating said reflecting element on an axis other than the optical axis to provide a wobble motion for scanning a bottle neck region;

(e) means for focusing the image of the bottom of said bottle on said reflecting element;

(f) a photocell disposed to receive radiant energy reflected from said reflecting element;

(g) said reflecting element reflecting the received radiation to said photocell whereby the total amount of said energy received by said reflecting element is momentarily subtsantially varied whenever one of said elements in the course of its rotation momentarily coincides with the position of the image of a particle of foreign matter disposed within said bottle;

(h) one of said elements being substantially a line and the other being a substantial area relative to said one element; and (i) said photocell being located with respect to said focusing means and said reflecting element so that said photocell is in the image plane, as focused by said reflecting element, of said focusing means.

13. In an empty bottle inspection machine, a detection system for detecting the presence of foreign matter within a bottle, said detection system comprising:

(a) means for directing radiant energy through a bottle;

(b) means for focusing from said radiant energy an image of the bottom of said bottle;

(c) a rotating surface having thereon a reflective segment, said surface being located substantially in the image plane of said bottom of said bottle as focused by said focusing means;

(d) said reflective segment being arranged to scan said image of said bottom of said bottle during rotation of said surface;

(e) a radiant energy sensor, said sensor being disposed in the path of radiant energy reflected from said segment, whereby the amount of said energy received by said segment is monentarily substantially varied whenever said segment in the course of rotation thereof coincides with the image of a particle of foreign matter disposed in said bottle proximate the bottom thereof;

(f) said rotating surface being so constructed and arranged so that the area proximate the neck of said bottle is focused by said reflective segment on said surface to an image plane;

(g) said radiant energy sensor being located in said image plane of said bottle neck;

(h) means for scanning said bottle neck image by said sensor in such manner that in the course of scanning, the image of a particle of foreign matter disposed substantially in the vicinity of said bottle neck will be brought into coincidence with said sensor;

(i) circuit means for producing an output signal indicating the condition of said sensor; and (j) means responsive to said output signal for rejecting a bottle from said inspection machine whereby when said output signal indicates the presence of foreign matter, the bottle is rejected.

14. In an empty bottle inspection machine, a detection system for detecting the presence of foreign particles within a bottle at an inspection station, said detection system including:
 (a) means for directing radiant energy through a bottle at said inspection station;
 (b) a radiant energy sensor;
 (c) radiant energy scanning means for receiving radiant energy passing through said bottle;
   (c-1) said radiant energy scanning means including non-reflecting rotating means having at least one reflecting segment upon the surface thereof which is small compared to the entire surface area of said scanning means;
 (d) said reflecting segment being so oriented with respect to said bottle as to reflect continuously during inspection the received radiant energy to said radiant energy sensor whereby the intensity of the reflected radiation to said sensor is momentarily substantially diminished if a particle of foreign matter is disposed within said bottle whenever said segment in the course of its rotation momentarily coincides with the angular position of the image of said particle; and
 (e) circuit means coupled to said sensor for producing a signal indicative of the presence of said particle, only when the intensity of said radiant energy received by said sensor is momentarily substantially diminished.

15. In an empty bottle inspection machine, a detection system for detecting the presence of foreign particles within a bottle, said detection system comprising:
 (a) means for directing radiant energy through a bottle in an inspection station;
 (b) a non-reflecting rotating surface having thereon at least one reflecting segment;
   (b-1) said reflecting segment being so constructed and arranged as to focus continuously during inspection an image of the bottle neck portion of said bottle to a predetermined plane;
 (c) radiant energy sensing means disposed in the vicinity of said plane;
 (d) means for rotating said surface in such a manner as to have succeeding portions of said image periodically focused upon said sensor whereby the amount of radiant energy received by said sensor is momentarily substantially diminished whenever the image of a particle of foreign matter disposed in the vicinity of the neck of said bottle coincides with the angular position of said sensor;
 (e) circuit means for producing output signal indicating the condition of said sensor; and
 (f) means responsive to said output signal for rejecting the bottle from said inspection machine whereby when said output signal indicates the presence of foreign matter the bottle is rejected.

16. In an empty bottle inspection machine a detection system for detecting the presence of foreign particles within a bottle, said detection system comprising:
 (a) means for directing radiant energy through a bottle;
 (b) a non-reflecting rotating surface having thereon a reflective segment, said reflective segment being arranged to focus an image of the area proximate the neck of said bottle to an image plane;
 (c) a radiant energy sensor located substantially in said image plane of said neck of said bottle whereby the amount of said energy received by said segment is momentarily substantially diminished whenever said sensor in the course of scanning coincides with the image of a particle of foreign matter disposed substantially in the vicinity of the neck of said bottle;
 (d) circuit means for producing output signal indicating the condition of said sensor; and
 (e) means responsive to the output signal for rejecting the bottle when said output signal indicates the presence of foreign matter.

17. In a detection system as defined in claim 14 wherein said reflecting segment is a line the width of which is no greater than the largest dimension of the smallest particle to be detected.

References Cited

UNITED STATES PATENTS

| | | | |
|---|---|---|---|
| 2,972,812 | 2/1961 | Jackson | 250—230 X |
| 2,997,598 | 8/1961 | Gramm | 250—230 X |
| 3,191,773 | 6/1965 | Wyman | 209—111.7 |
| 3,283,898 | 11/1966 | Calhoun | 88—14 X |

WALTER STOLWEIN, *Primary Examiner.*

U.S. Cl. X.R.
250—233; 88—14